US010085177B2

(12) United States Patent
Hong et al.

(10) Patent No.: US 10,085,177 B2
(45) Date of Patent: *Sep. 25, 2018

(54) METHOD AND APPARATUS FOR OFFLOADING DATA

(71) Applicant: AVAGO TECHNOLOGIES GENERAL IP (SINGAPORE) PTE. LTD., Singapore (SG)

(72) Inventors: Wei Hong, Beijing (CN); Na Wei, Beijing (CN); Haiming Wang, Beijing (CN); Erlin Zeng, Beijing (CN); Wei Bai, Beijing (CN); Pengfei Sun, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,132

(22) Filed: Nov. 16, 2016

(65) Prior Publication Data

US 2017/0070913 A1    Mar. 9, 2017

Related U.S. Application Data

(63) Continuation of application No. 14/391,945, filed on Oct. 30, 2014, now Pat. No. 9,532,269, which is a
(Continued)

(51) Int. Cl.
*H04W 28/08* (2009.01)
*H04W 76/15* (2018.01)
(Continued)

(52) U.S. Cl.
CPC ........... *H04W 28/085* (2013.01); *H04W 8/22* (2013.01); *H04W 36/22* (2013.01); *H04W 76/15* (2018.02);
(Continued)

(58) Field of Classification Search
CPC ..... H04W 28/08; H04W 76/02; H04W 36/22; H04W 76/023; H04W 28/085
See application file for complete search history.

(56) References Cited

U.S. PATENT DOCUMENTS

2007/0025296 A1* 2/2007 Jung ..................... H04W 36/32
370/331
2011/0222523 A1* 9/2011 Fu .......................... H04W 36/22
370/338
(Continued)

FOREIGN PATENT DOCUMENTS

CN    101345999 A    1/2009
CN    101730279      6/2010
(Continued)

*Primary Examiner* — Lakeram Jangbahadur
(74) *Attorney, Agent, or Firm* — Oblon, McClelland, Maier & Neustadt, L.L.P.

(57) ABSTRACT

A method, apparatus and computer program product are provided for enabling efficient allocation of discovery resources for device to device communications. An example method may comprise establishing a cellular network connection to an access point. The method may further comprise establishing a local area network connection to a user equipment. Additionally, the method may comprise either receiving offloaded data for the user equipment from the access point via the cellular network connection and relaying the offloaded data to the user equipment via the local area network connection, or receiving offloaded data for the access point from the user equipment via the local area network connection and relaying the offloaded data to the access point via the cellular network connection. Similar and related example methods, example apparatuses, and example computer program products are also provided.

16 Claims, 8 Drawing Sheets

Related U.S. Application Data continuation of application No. PCT/CN2012/073800, filed on Apr. 11, 2012.

(51) Int. Cl.
*H04W 36/22* (2009.01)
*H04W 8/22* (2009.01)
*H04W 84/12* (2009.01)
*H04W 88/06* (2009.01)
*H04W 88/10* (2009.01)
*H04W 84/04* (2009.01)

(52) U.S. Cl.
CPC .......... *H04W 84/042* (2013.01); *H04W 84/12* (2013.01); *H04W 88/06* (2013.01); *H04W 88/10* (2013.01)

(56) References Cited

U.S. PATENT DOCUMENTS

| | | | |
|---|---|---|---|
| 2012/0113965 A1* | 5/2012 | Puthenpura | H04W 28/08 370/338 |
| 2012/0230191 A1* | 9/2012 | Fang | H04W 36/22 370/235 |

FOREIGN PATENT DOCUMENTS

| | | | |
|---|---|---|---|
| WO | WO 2011110108 A1 | 9/2011 | |
| WO | WO 2012051885 A1 | 4/2012 | |

* cited by examiner

METHOD AND APPARATUS FOR OFFLOADING DATA

CROSS-REFERENCE TO RELATED APPLICATIONS

The present application is a continuation of U.S. application Ser. No. 14/391,945 filed Oct. 30, 2014, now U.S. Pat. No. 9,532,269, which is a National Stage of PCT/CN2012/073800 filed Apr. 11, 2012, the entire contents of each of which are incorporated herein by reference.

TECHNOLOGICAL FIELD

An example embodiment of the present invention relates generally to offloading data and, more particularly, to offloading cellular network data to a local area network using a dual mode router.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Due at least in part to the expansion of wireless networking technologies, some cellular networks have experienced congestion, lack of capacity, low throughput and/or bandwidth, difficulties controlling data costs, and inconvenience to the user. In addition to cellular networks, many user devices may be configured to access local area networks for data access. Some existing technologies may allow for a cellular network completely handing over a cellular network connection with a user device to a local area network. The handover process can be costly, complicated, and inefficient.

As a result, there is a need in the art for advantageously offloading cellular network traffic to a local area network without completely handing over control of the data to the local area network.

BRIEF SUMMARY

Methods, apparatuses, and computer program products are herein provided for offloading cellular network data to a local area network using a dual mode router. In an example embodiment, a method is provided, which may comprise establishing a cellular network connection to an access point; establishing a local area network connection to a user equipment; and at least one of receiving offloaded data for the user equipment from the access point via the cellular network connection; and relaying the offloaded data to the user equipment via the local area network connection; or receiving offloaded data for the access point from the user equipment via the local area network connection; and relaying the offloaded data to the access point via the cellular network connection.

In another embodiment, an apparatus is provided that includes at least one processor and at least one memory including computer program code with the at least one memory and the computer program code being configured to, with at least one processor, cause the apparatus to at least establish a cellular network connection to an access point; establish a local area network connection to a user equipment; and at least one of receive offloaded data for the user equipment from the access point via the cellular network connection; and relay the offloaded data to the user equipment via the local area network connection; or receive offloaded data for the access point from the user equipment via the local area network connection; and relay the offloaded data to the access point via the cellular network connection.

In a further embodiment, a computer program product is provided that includes at least one non-transitory computer-readable storage medium having computer-readable program instructions stored therein with the computer-readable program instructions including program instructions configured to establish a cellular network connection to an access point; establish a local area network connection to a user equipment; and at least one of receive offloaded data for the user equipment from the access point via the cellular network connection; and relay the offloaded data to the user equipment via the local area network connection; or receive offloaded data for the access point from the user equipment via the local area network connection; and relay the offloaded data to the access point via the cellular network connection.

In yet another embodiment, an apparatus is provided that includes means for establishing a cellular network connection to an access point; means for establishing a local area network connection to a user equipment; and means for at least one of receiving offloaded data for the user equipment from the access point via the cellular network connection; and relaying the offloaded data to the user equipment via the local area network connection; or receiving offloaded data for the access point from the user equipment via the local area network connection; and relaying the offloaded data to the access point via the cellular network connection.

In one embodiment, a method is provided that may comprise establishing a cellular network connection to an access point; establishing a local area network connection to a dual mode router; and receiving offloaded cellular network data from the dual mode router via the local area network connection or transmitting offloaded cellular network data to the dual mode router via the local area network connection.

In another embodiment, an apparatus is provided that includes at least one processor and at least one memory including computer program code with the at least one memory and the computer program code being configured to, with the at least one processor, cause the apparatus to at least establish a cellular network connection to an access point; establish a local area network connection to a dual mode router; and receive offloaded cellular network data from the dual mode router via the local area network connection or transmit offloaded cellular network data to the dual mode router via the local area network connection.

In a further embodiment, a computer program product is provided that includes at least one non-transitory computer-readable storage medium having computer-readable program instructions stored therein with the computer-readable program instructions including program instructions configured to establish a cellular network connection to an access point; establish a local area network connection to a dual mode router; and receive offloaded cellular network data from the dual mode router via the local area network connection or transmit offloaded cellular network data to the dual mode router via the local area network connection.

In yet another embodiment, an apparatus is provided that includes means for establishing a cellular network connection to an access point; means for establishing a local area network connection to a dual mode router; and means for receiving offloaded cellular network data from the dual mode router via the local area network connection or transmitting offloaded cellular network data to the dual mode router via the local area network connection.

In one embodiment, a method is provided that may comprise providing for transmission to a user equipment of identification information associated with a dual mode router proximate the user equipment; providing for transmission to the dual mode router of identification information associated with the user equipment; receiving a request from the dual mode router to offload cellular network data associated with the user equipment to the dual mode router; and offloading the cellular network data associated with the user equipment to the dual mode router via a cellular network connection with the dual mode router.

In another embodiment, an apparatus is provided that includes at least one processor and at least one memory including computer program code with the at least one memory and the computer program code being configured to, with the at least one processor, cause the apparatus to at least provide for transmission to a user equipment of identification information associated with a dual mode router proximate the user equipment; provide for transmission to the dual mode router of identification information associated with the user equipment; receive a request from the dual mode router to offload cellular network data associated with the user equipment to the dual mode router; and offload the cellular network data associated with the user equipment to the dual mode router via a cellular network connection with the dual mode router.

In a further embodiment, a computer program product is provided that includes at least one non-transitory computer-readable storage medium having computer-readable program instructions stored therein with the computer-readable program instructions including program instructions configured to providing for transmission to a user equipment of identification information associated with a dual mode router proximate the user equipment; providing for transmission to the dual mode router of identification information associated with the user equipment; receiving a request from the dual mode router to offload cellular network data associated with the user equipment to the dual mode router; and offloading the cellular network data associated with the user equipment to the dual mode router via a cellular network connection with the dual mode router.

In yet another embodiment, an apparatus is provided that includes means for provide for transmission to a user equipment of identification information associated with a dual mode router proximate the user equipment; provide for transmission to the dual mode router of identification information associated with the user equipment; receive a request from the dual mode router to offload cellular network data associated with the user equipment to the dual mode router; and offload the cellular network data associated with the user equipment to the dual mode router via a cellular network connection with the dual mode router.

BRIEF DESCRIPTION OF THE SEVERAL VIEWS OF THE DRAWINGS

Figure 1:
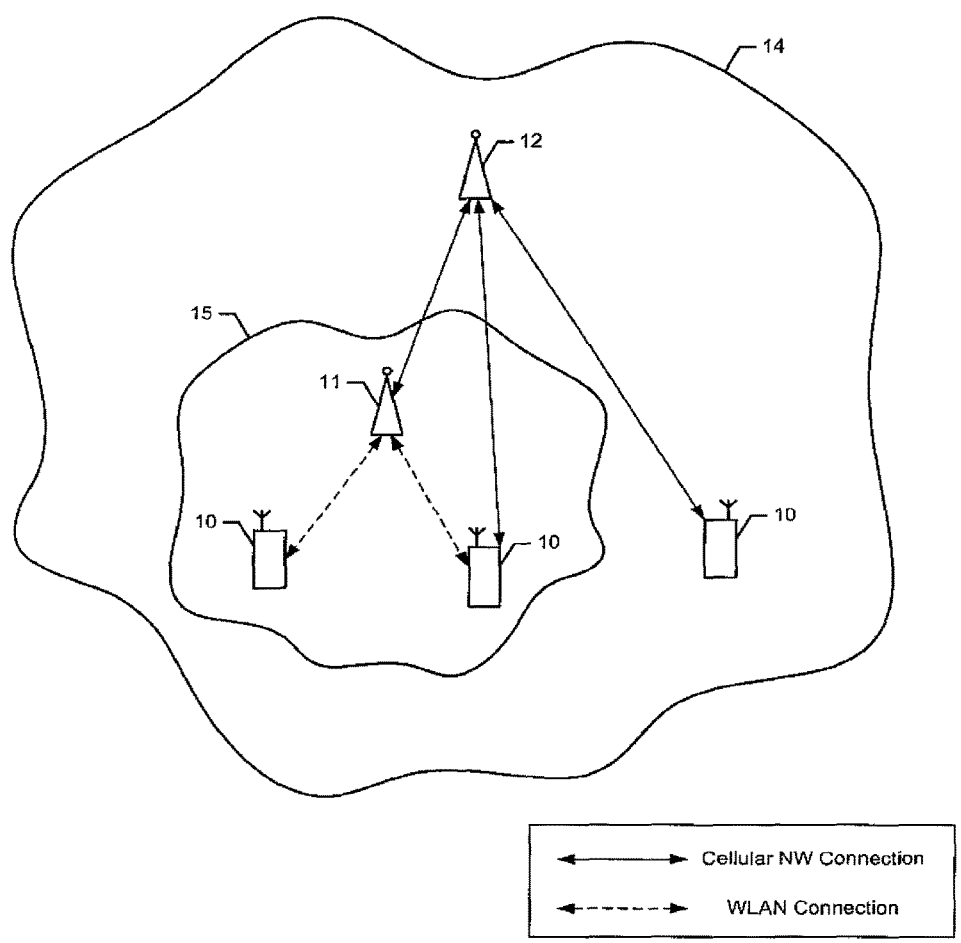
Figure 2:
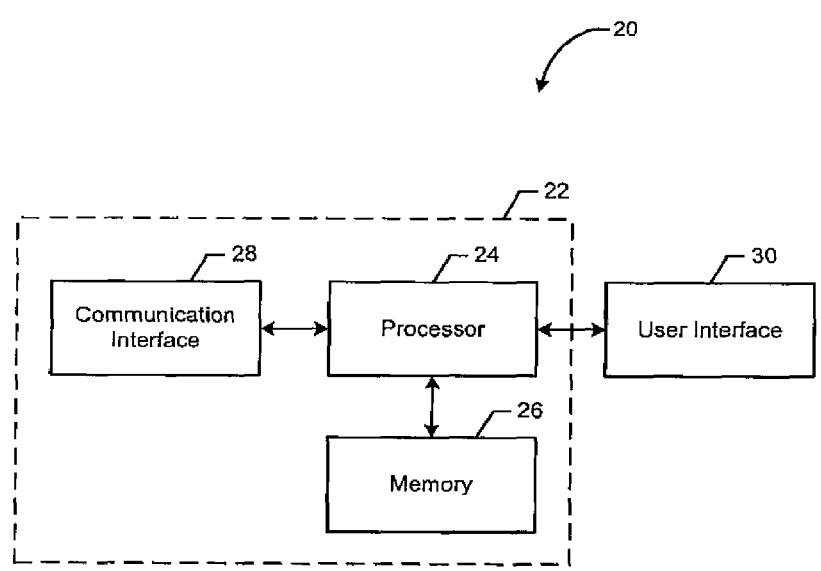
Figure 3:
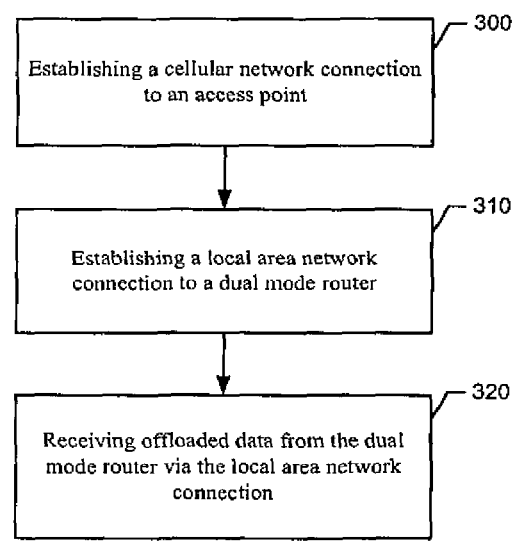
Figure 4:
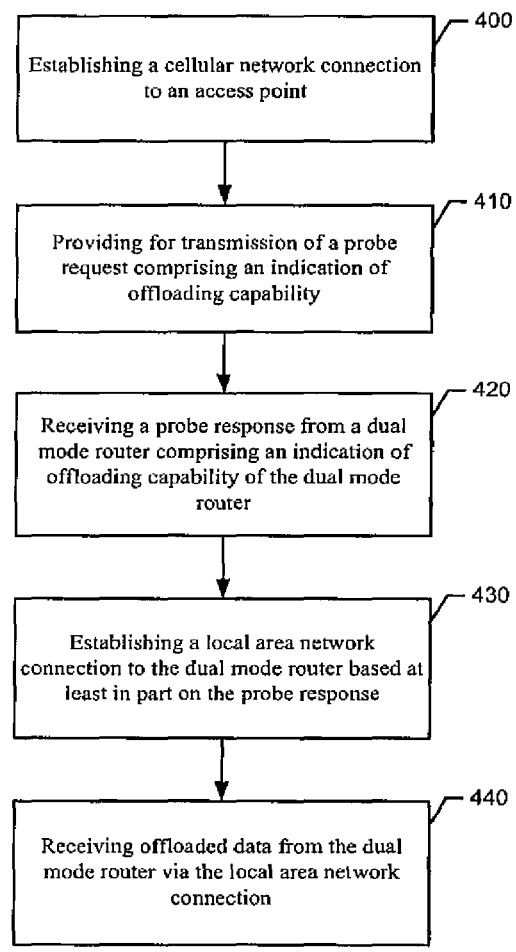
Figure 5:
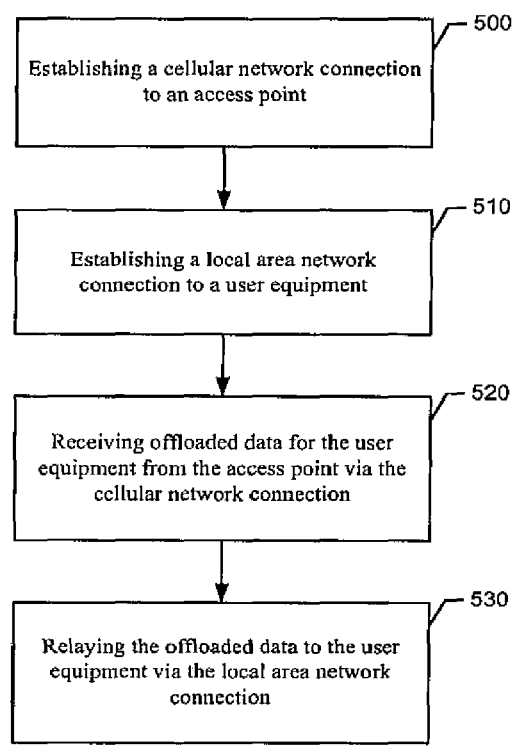
Figure 6:
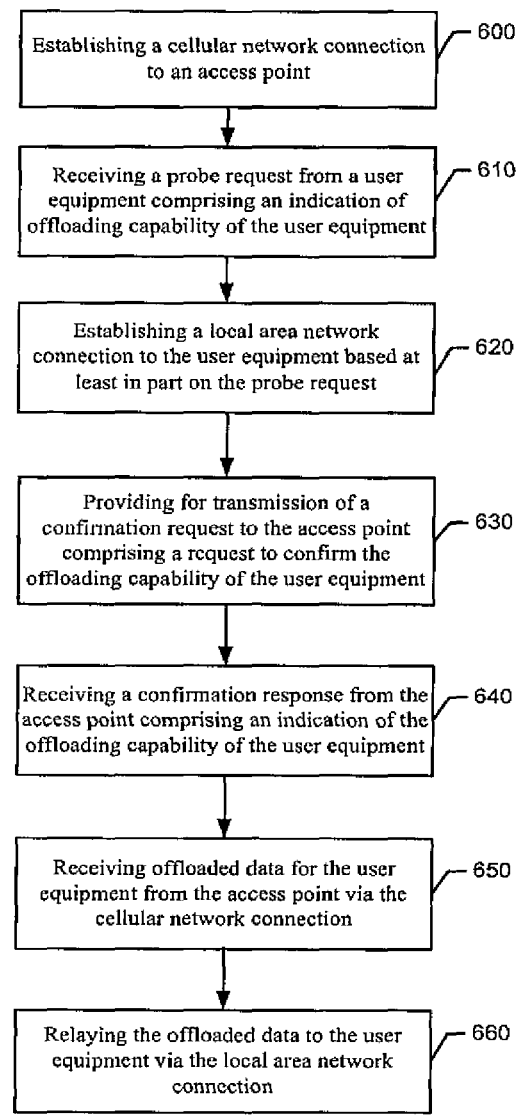
Figure 7:
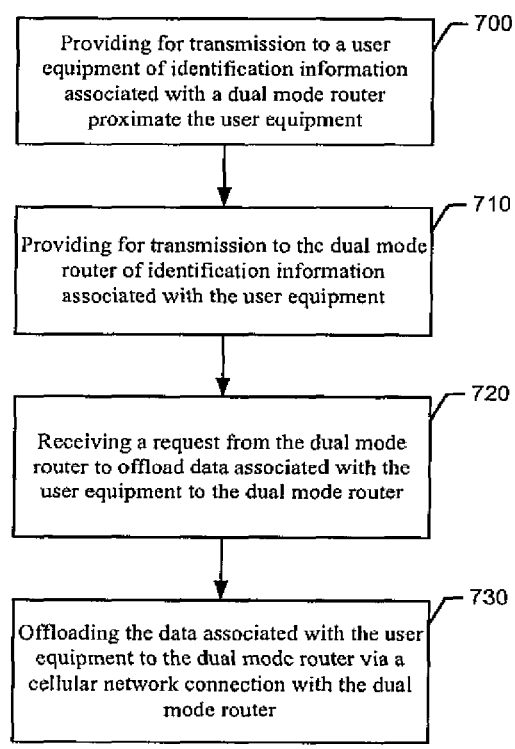
Figure 8:
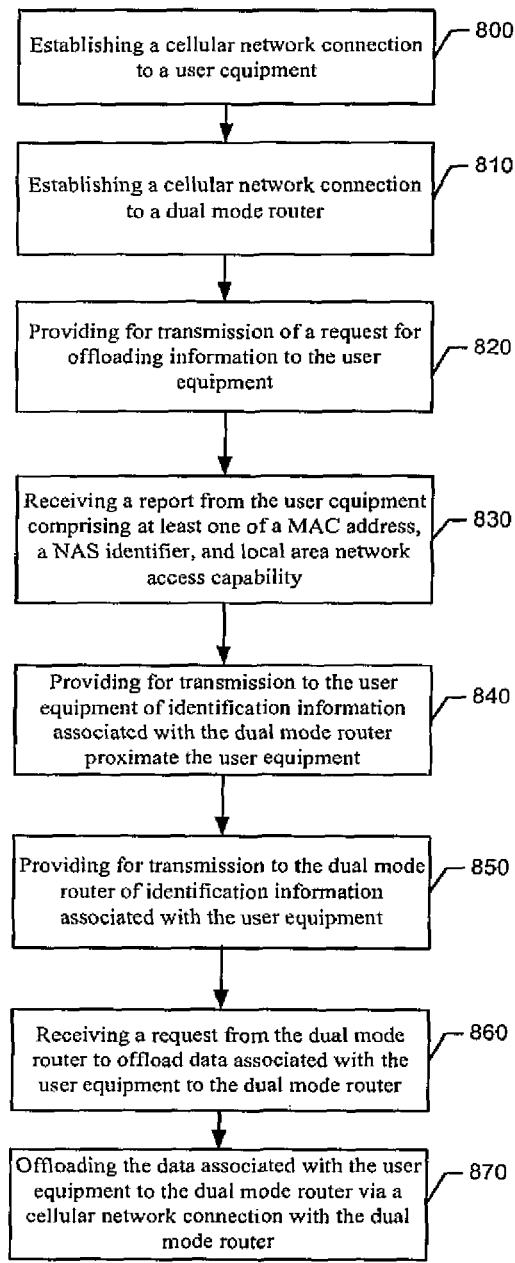

Having thus described several example embodiments of the invention in general terms, reference will now be made to the accompanying drawings, which are not necessarily drawn to scale, and wherein:

FIG. 1 is a schematic representation of a system for offloading cellular network data to a local area network using a dual mode router in accordance with an example embodiment of the present invention;

FIG. 2 is a block diagram of an apparatus that may be embodied as a device that is configured for offloading cellular network data to a local area network using a dual mode router in accordance with an example embodiment of the present invention;

FIGS. 3-4 are flowcharts of the operations performed by an apparatus embodied by a user equipment for offloading cellular network data to a local area network using a dual mode router in accordance with one embodiment of the present invention;

FIGS. 5-6 are flowcharts of the operations performed by an apparatus embodied by a dual mode router for offloading cellular network data to a local area network using a dual mode router in accordance with one embodiment of the present invention; and FIGS. 7-8 are flowcharts of the operations performed by an apparatus embodied by an access point for offloading cellular network data to a local area network using a dual mode router in accordance with one embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are provided in accordance with an example embodiment of the present invention in order to offload cellular network data to a local area network using a dual mode router. In this regard, some advantageous embodiments may allow an access point of a cellular network to offload cellular network traffic associated with a user equipment to a dual mode router. The dual mode router may then transmit/receive the cellular network data associated with the user equipment to/from the access point via a cellular network connection, and then act as a rely to transmit/receive the cellular network data associated with the user equipment to/from the user equipment via a local area connection.

Although the method, apparatus and computer program product may be implemented in a variety of different systems, one example of such a system is shown in FIG. 1, which includes one or more terminal apparatuses (e.g., user equipment 10), one or more relay apparatuses (e.g., dual mode router 11), one or more network apparatuses (e.g., access point 12), and one or more networks (e.g., cellular network 14 and/or wireless local area network (WLAN) 15).

A user equipment 10 may be embodied as any computing device, such as, for example, a desktop computer, laptop computer, mobile terminal, mobile computer, mobile phone, mobile communication device, tablet computing device, game device, digital camera/camcorder, audio/video player, television device, radio receiver, digital video recorder, positioning device, portable digital assistant (PDA), pager, or any of numerous other computing devices, computation devices, content generation devices, content consumption devices, universal serial bus (USB) dongles, data cards or combinations thereof. As such, the user equipment 10 may include one or more processors that may define processing circuitry either alone or in combination with one or more memories. The processing circuitry may utilize instructions stored in the memory to cause the user equipment 10 to operate in a particular way or execute specific functionality when the instructions are executed by the one or more processors. The user equipment 10 may also include communication circuitry and corresponding hardware/software to enable communication with other devices and/or the networks 14, 15.

An access point 12 may, for example, be at least partially embodied on an access point of the cellular network 14 (for example, a macrocell, microcell, picocell, femtocell, closed subscriber group (CSG) cell, base station, base transceiver station (BTS), node B, evolved node B (eNodeB), access point (AP), group owner, mesh station (STA), mesh point, and/or the like), which may, for example be configured to provide access to the cellular network 14 (e.g., via a radio uplink) to one or more of the user equipments 10. A dual mode router 11 may be embodied as any computing device configured to access both the cellular network 14 and WLAN 15, such as a relay, server, router, access point, base station, and/or the like. In this regard, the dual mode router 11 may be configured to maintain a connection to the cellular network 14 and a separate connection to the WLAN 15 at the same time. In some embodiments, a dual mode router 11 may be embodied as any user equipment 10 or access point 12 device listed above having dual network access capability. A network (e.g., cellular network 14 and/or WLAN 15) may comprise one or more wireline networks, one or more wireless networks, or some combination thereof. For example, a network may include a collection of various different nodes, devices, or functions that may be in communication with each other via corresponding wired and/or wireless interfaces.

The cellular network 14 may, for example, comprise a serving network (e.g., a serving cellular network) for one or more user equipments 10. The cellular network 14 may comprise, in certain embodiments, one or more of the user equipments 10, one or more of the dual mode routers 11, and/or one or more of the access points 12 themselves. In some embodiments, the cellular network 14 may comprise a public land mobile network (for example, a cellular network), such as may be implemented by a network operator (for example, a cellular access provider). While the cellular network 14 may be configured in accordance with current and future implementations of Third Generation Partnership Project (3GPP) Long Term Evolution (LTE) or LTE-Advanced (LTE-A) standards, the cellular network 14 may employ other mobile access mechanisms such as Universal Mobile Telecommunications System (UMTS), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data GSM Environment (EDGE), and/or the like.

The WLAN 15 may, for example, comprise a local network for one or more user equipments 10. The WLAN 15 may comprise, in certain embodiments, one or more of the user equipments 10 and/or one or more of the dual mode routers 11 themselves. While the WLAN 15 may be configured in accordance with Wi-Fi standards, the WLAN 15 may employ other wireless network techniques, such as 6LoWpan, Wi-Fi low power, Institute of Electrical and Electronics Engineers (IEEE) 802.11 techniques, IEEE 802.15 techniques, IEEE 802.16 techniques, and/or the like.

According to various embodiments, one or more user equipments 10 may be configured to connect with one or more access points 12 over the cellular network 14. In this regard, the one or more user equipments 10 may be configured to access the cellular network 14 through the one or more access points 12, in some instances via one or more additional intervening network elements. Additionally, one or more dual mode routers 11 may be configured to connect with one or more access points 12 over the cellular network 14. The one or more dual mode routers 11 may also be configured to connect to one or more user equipments 10 via the WLAN 15. In this regard, the one or more user equipments 10 may be configured to access the WLAN 15, and therefore one or more other user equipments connected to the WLAN 15, through the one or more dual mode routers 11.

FIG. 2 illustrates a block diagram of a generically described apparatus 20, which, in various embodiments, may be embodied by or otherwise included with any or all of the entities of the system described above. As shown in FIG. 2, the apparatus 20 may include or otherwise be in communication with a processing system including, for example, processing circuitry 22 that is configurable to perform actions in accordance with example embodiments described herein. The processing circuitry may be configured to perform data processing, application execution, and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include at least one processor 24 and at least one memory 26 that may be in communication with or otherwise control a communication interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the user equipment 10, the processing circuitry may be embodied as a portion of a mobile computing device or other mobile terminal; in other embodiments taken in the context of the dual mode router 11, the processing circuitry may be embodied as a portion of a relay or router; and in yet other embodiments taken in the context of the access point 12, the processing circuitry may be embodied as a portion of an eNodeB.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In some embodiments, the user interface includes user interface circuitry configured to facilitate at least some functions of the user equipment 10 by receiving user input and providing output.

The communication interface 28 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14, 15 and/or any other device or module in communication with the processing circuitry 22, such as between the user equipment 10 and another entity, such as a dual mode router 11 and/or access point 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet and/or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted above, in some embodiments, the user equipment 10, dual mode router 11, and/or access point 12 may be embodied as or otherwise include an apparatus 20 as generically represented by the block diagram of FIG. 2. While the apparatus 20 may be employed, for example, by a mobile terminal in the case of a user equipment, a relay in the case of a dual mode router, and/or an eNodeB in the case of an access point, it should be noted that the components, devices or elements described above may not be mandatory and thus some may be omitted in certain embodiments. Additionally, some embodiments may include further or different components, devices or elements beyond those shown and described herein. While the following example embodiments are described with respect to one or more user equipments 10, one or more dual mode routers 11, and/or one or more access points 12, it should be appreciated that these elements may be embodied as or otherwise include an apparatus 20, and thus the functionality of the one or more user equipments 10, one or more dual mode routers 11, and/or one or more access points 12 described in the following example embodiments may be performed by various means of the apparatus 20 and/or its components, devices, or elements (e.g., means, such as the processing circuitry 22, the processor 24 or the like).

According to various embodiments, a user equipment 10 may be configured to connect to an access point 12 via a cellular network 14 (e.g., an LTE or LTE-A network). At any given time, the access point 12 may desire to offload the data traffic associated with the user equipment 10 to another device (e.g., dual mode router 11) or network (e.g., WLAN 15). For example, the access point 12 may wish to offload the user equipment 10 data traffic due to congestion on the cellular network 14, lack of capacity of the cellular network 14, low throughput and or bandwidth of the cellular network 14, data cost control, convenience to the user, and/or the like. In these instances, the access point 12 may be configured to provide for transmission of a request for offloading information associated with the user equipment 10. The user equipment 10 may receive the request and, in response, provide for transmission of a offloading information report to the access point 12. The offloading information may comprise, for example, a media access control (MAC) address of the user equipment 10, a non access stratum (NAS) identifier of the user equipment 10, local area network capabilities (e.g., whether user equipment 10 comprises a WiFi radio), and/or the like. This communication in the cellular network 14 between the user equipment 10 and the access point 12, in certain embodiments, may occur via signaling specific to requesting and reporting offloading information, such as radio resource control (RRC) signaling, a MAC communication element (CE), and/or the like.

After receiving the offloading information from the user equipment 10, the access point 12 may be configured to provide for transmission to the user equipment 10 of identification information associated with at least one dual mode router 11. The at least one dual mode router 11 may be located relatively proximate (e.g., within connectivity range of) the user equipment 10. That is, the access point 12 may be configured to determine at least one dual mode router 11 neighboring the current location of the user equipment 10, and provide identification information (e.g., a list of identification information) related to the at least one dual mode router 11 to the user equipment 10. The identification information may comprise a MAC address of the dual mode router 11, a NAS identifier of the dual mode router 11, a service set identification (SSID) associated with the dual mode router 11, and/or the like. In some embodiments, the access point 12 may be further configured to provide for transmission to the dual mode router 11 of identification information associated with the user equipment 10. The identification information may comprise a MAC address of the dual mode router 11, a NAS identifier of the dual mode router 11, a service set identification (SSID) associated with the dual mode router 11, and/or the like. The communication in the cellular network 14 between the user equipment 10 and the access point 12 as well as between the access point 12 and the dual mode router 11, in certain embodiments, may occur via signaling specific to providing identification information, such as radio resource control (RRC) signaling, a MAC communication element (CE), and/or the like.

According to example embodiments, the user equipment 10 may be configured to connect to one of the at least one dual mode routers 11 identified by the access point 12. In this regard, the connection may comprise a local area network connection, for example a WLAN 15 connection. In other embodiments, the user equipment 10 may already be connected to the dual mode router 11. In these embodiments, the existing connection between the user equipment 10 and the dual mode router 11 may not need to be reestablished. The WLAN 15 over which the user equipment 10 connects to the dual mode router 11 may be a separate network from the cellular network 14 over which the user equipment 10 and dual mode router 11 are connected to the access point 12. In some instances, the user equipment 10 may initiate the WLAN 15 connection with the dual mode router 11, while in other instances the dual mode router 11 may initiate the WLAN 15 connection with the user equipment 10. Prior to establishing the connection, the dual mode router 11 may be configured to confirm, in certain embodiments, that the user equipment 10 is one of the user equipments 10 identified by the access point 12 as configured for offloading. According to example embodiments, the dual mode router 11 may skip authentication of any user equipment 10 identified by the access point 12 when establishing the WLAN 15 connection with the user equipment 10. The dual mode router 11 may further assign a higher priority to communications with the user equipment 10 to be offloaded than to communications with other devices connected to the dual mode router 11 that are not to be offloaded. For example, the dual mode router 11 may be configured to send traffic first to those user equipments 10 configured for offloading and second to the remaining user equipments 10 not configured for offloading. In some instances, the dual mode router 11 may be configured to assign the higher priority based at least in part on the type of the traffic, amount of traffic, type of the user equipment, channel quality experienced by the user equipment, location of the user equipment, and/or the like.

In various embodiments, the dual mode router 11 may notify the access point 12 that a connection to the user equipment 10 has been established. For example, the dual mode router 11 may provide for transmission to the access point 12 of an identifier of the user equipment 10 to be offloaded. The dual mode router 11 may request that the cellular network 14 traffic of the user equipment 10 be offloaded to the dual mode router 11, or in other embodiments, the access point 12 may automatically begin offloading the cellular network 14 traffic of the user equipment 10 to the dual mode router 11. In this regard, the access point 12 may begin transmitting all cellular network 14 traffic associated with the user equipment 10 to the dual mode router 11, for example, via the cellular network 14 connection with the dual mode router 11. The dual mode router 11 may subsequently relay the cellular network 14 traffic associated with the user equipment 10 to the user equipment 10, for example, via the WLAN 15 connection. Similarly, the user equipment 10 may be configured to transmit to the dual mode router 11 the outgoing cellular network 14 traffic associated with the user equipment 10, for example via the WLAN 15 connection. The dual mode router 11 may subsequently relay the outgoing user equipment 10 cellular network 14 traffic to the access point 12, for example, via the cellular network 14 connection.

According to other embodiments, the user equipment 10 may initiate the offloading procedure rather than the access point 12. In some instances, the user equipment 10 may be configured to provide for transmission to the access point 12 of an offloading request message. The offloading request message may comprise, for example, a MAC address of the user equipment 10, a NAS identifier of the user equipment 10, local area network capabilities (e.g., whether user equipment 10 comprises a WiFi radio), and/or the like. In other instances, the user equipment 10 may be configured to request offloading via the dual mode router 11.

In an example embodiment, the user equipment 10 may transmit a probe request comprising an indication of offloading capability of the user equipment 10. For example, the probe request may comprise one or more bits of information comprising the indication of offloading capability of the user equipment 10. The probe request may be a broadcast request to a plurality of dual mode routers 11 or a directed probe request to a particular dual mode router 11. The dual mode router 11 may be configured to receive the probe request and, in response, to transmit a probe response. The probe response may, in certain instances, comprise an indication of the offloading capability of the dual mode router 11. The probe request and response may be transmitted via RRC signaling, a MAC communication element (CE), and/or the like. The user equipment 10 and dual mode router 11 may establish a WLAN 15 connection in response to transmitting and receiving the probe request and/or response.

In another example embodiment, the dual mode router 11 may transmit a beacon message comprising an indication of offloading capability of the dual mode router 11. For example, the beacon message may comprise one or more bits of information comprising the indication of offloading capability of the dual mode router 11. The user equipment 10 may be configured to receive the beacon message and, in response, to transmit a beacon response. The beacon response may, in certain instances, comprise an indication of the offloading capability of the user equipment 10. The beacon message and response may be transmitted via RRC signaling, a MAC communication element (CE), and/or the like. The user equipment 10 and dual mode router 11 may establish a WLAN 15 connection in response to transmitting and receiving the beacon message and/or response.

In some embodiments, the dual mode router 11 may be configured to provide for transmission of an offloading confirmation request to the access point 12 to confirm that the user equipment 10 is capable of being offloaded to the dual mode router 11. For example, the dual mode router 11 may confirm with the access point 12 that the user equipment 10 may be offloaded to the dual mode router 11 prior to establishing a connection with the user equipment 10. The offloading confirmation request may comprise an indication of the user equipment 10, for example a MAC address of the user equipment 10, a NAS identifier of the user equipment 10, and/or the like. The access point 12 may receive the offloading confirmation request and transmit an offloading confirmation response to the dual mode router 11 in response indicating the offloading capability of the user equipment 10. The dual mode router 11 may be configured to receive the offloading confirmation response and, in some instances, to determine whether to establish a connection to the user equipment 10 based at least in part on the response. The communication in the cellular network 14 between the dual mode router 11 and the access point 12, in certain embodiments, may occur via signaling specific to requesting and responding to an offloading confirmation message, such as radio resource control (RRC) signaling, a MAC communication element (CE), and/or the like Once the WLAN 15 connection is established between the user equipment 10 and the dual mode router 11, the dual mode router 11 may notify the access point 12 that a connection to the user equipment 10 has been established. For example, the dual mode router 11 may provide for transmission to the access point 12 of an identifier of the user equipment 10 to be offloaded. The dual mode router 11 may request that the cellular network 14 traffic of the user equipment 10 be offloaded to the dual mode router 11, or in other embodiments, the access point 12 may automatically begin offloading the cellular network 14 traffic of the user equipment 10 to the dual mode router 11. In this regard, the access point 12 may begin transmitting all cellular network 14 traffic associated with the user equipment 10 to the dual mode router 11, for example, via the cellular network 14 connection with the dual mode router 11. The dual mode router 11 may subsequently relay the cellular network 14 traffic associated with the user equipment 10 to the user equipment 10, for example, via the WLAN 15 connection. Similarly, the user equipment 10 may be configured to transmit to the dual mode router 11 the outgoing cellular network 14 traffic associated with the user equipment 10, for example via the WLAN 15 connection. The dual mode router 11 may subsequently relay the outgoing user equipment 10 cellular network 14 traffic to the access point 12, for example, via the cellular network 14 connection FIGS. 3-8 are flowcharts illustrating the operations performed by a method, apparatus, and computer program product, such as apparatus 20 of FIG. 2, from the perspective of a user equipment 10 in regard to FIGS. 3-4, a dual mode router 11 in regard to FIGS. 5-6, and an access point 12 in regard to FIGS. 7-8 in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a non-transitory memory device 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3-8, when executed, convert a computer or processing circuitry into a particular machine configured to perform an example embodiment of the present invention. Accordingly, the operations of FIGS. 3-8 define an algorithm for configuring a computer or processing circuitry 22, e.g., processor, to perform an example embodiment. In some cases, a general purpose computer may be provided with an instance of the processor which performs the algorithm of FIGS. 3-8 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

In some embodiments, certain ones of the operations below may be modified or further amplified as described above. Moreover, in some embodiments additional optional operations may also be included, and in other embodiments one or more of the operations may be excluded. It should be appreciated that each of the modifications, optional additions or amplifications above may be included with the operations below either alone or in combination with any others among the features described herein. It should also be appreciated that the flowcharts are merely examples, and should not be seen as limiting the invention to a particular order. That is, certain embodiments may comprise one or more of the operations illustrated in the flowcharts in a different order.

Referring now to FIG. 3, the operations performed by a method, apparatus and computer program product of an example embodiment are illustrated from the perspective of a user equipment 10. The method may comprise establishing a cellular network connection to an access point at operation 300. At operation 310, the method may comprise establishing a local area network connection to a dual mode router.

The method may also comprise receiving offloaded data from the dual mode router via the local area network connection at operation 320.

Referring now to FIG. 4, the operations performed by a method, apparatus and computer program product of an example embodiment are illustrated from the perspective of a user equipment 10. The method may comprise establishing a cellular network connection to an access point at operation 400. At operation 410, the method may comprise providing for transmission of a probe request. The probe request may comprise an indication of offloading capability. Additionally, the method may comprise receiving a probe response from a dual mode router at operation 420. The probe response may comprise an indication of offloading capability of the dual mode router. At operation 430, the method may comprise establishing a local area network connection to the dual mode router based at least in part on the probe response. The method may also comprise receiving offloaded data from the dual mode router via the local area network connection at operation 440.

Referring now to FIG. 5, the operations performed by a method, apparatus and computer program product of an example embodiment are illustrated from the perspective of a dual mode router 11. The method may comprise establishing a cellular network connection to an access point at operation 500. At operation 510, the method may comprise establishing a local area network connection to a user equipment. The method may further comprise receiving offloaded data for the user equipment from the access point via the cellular network connection at operation 520. At operation 530, the method may comprise relaying the offloaded data to the user equipment via the local area network connection.

Referring now to FIG. 6, the operations performed by a method, apparatus and computer program product of an example embodiment are illustrated from the perspective of a dual mode router 11. The method may comprise establishing a cellular network connection to an access point at operation 600. At operation 610, the method may comprise receiving a probe request from a user equipment. The probe request may comprise an indication of offloading capability of the user equipment. The method may further comprise establishing a local area network connection to the user equipment based at least in part on the probe request at operation 620. At operation 630, the method may also comprise providing for transmission of a confirmation request to the access point. The confirmation request may comprise a request to confirm the offloading capability of the user equipment. At operation 640, the method may comprise receiving a confirmation response from the access point. The confirmation response may comprise an indication of the offloading capability of the user equipment. The method may further comprise receiving offloaded data for the user equipment from the access point via the cellular network connection at operation 650. At operation 660, the method may comprise relaying the offloaded data to the user equipment via the local area network connection.

Referring now to FIG. 7, the operations performed by a method, apparatus and computer program product of an example embodiment are illustrated from the perspective of a access point 12. The method may comprise providing for transmission to a user equipment of identification information associated with a dual mode router proximate the user equipment at operation 700. At operation 710, the method may comprise providing for transmission to the dual mode router of identification information associated with the user equipment. The method may also comprise receiving a request from the dual mode router to offload data associated with the user equipment to the dual mode router at operation 720. At operation 730, the method may further comprise offloading the data associated with the user equipment to the dual mode router via a cellular network connection with the dual mode router.

Referring now to FIG. 8, the operations performed by a method, apparatus and computer program product of an example embodiment are illustrated from the perspective of a access point 12. The method may comprise establishing a cellular network connection to a user equipment at operation 800. At operation 810, the method may comprise establishing a cellular network connection to a dual mode router. The method may also comprise providing for transmission of a request for offloading information to the user equipment at operation 820. At operation 830, the method may also comprise receiving a report comprising offloading information from the user equipment. The offloading information may comprise at least one of a media access control address, a non access stratum identifier, and local area network access capability. The method may comprise providing for transmission to the user equipment of identification information associated with the dual mode router proximate the user equipment at operation 840. At operation 850, the method may comprise providing for transmission to the dual mode router of identification information associated with the user equipment. The method may also comprise receiving a request from the dual mode router to offload data associated with the user equipment to the dual mode router at operation 860. At operation 870, the method may further comprise offloading the data associated with the user equipment to the dual mode router via a cellular network connection with the dual mode router.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising:
   at least one processor; and
   at least one memory including computer program code, wherein the at least one memory and the computer program code are configured to, with the at least one processor, cause the apparatus to at least:
   receive a probe request from at least one of a plurality of user equipments, the probe request comprising an indication of offloading capability, media access control address, and service set identifier of the at least one of the plurality of user equipments;

provide for transmission of a probe response to the at least one of the plurality of user equipments;
establish a local area network connection to the at least one of the plurality of user equipments based at least in part on the probe request, the local area connection being established to offload traffic from the cellular network;
provide for transmission of a confirmation request to an access point, the confirmation request comprises a request to confirm the offloading capability of at least one of the plurality of user equipments;
relay data received from the access point via a cellular network connection to the at least one of the plurality of user equipments via the local area network connection to the at least one of the plurality of user equipments; and
relay second data received from the at least one of the plurality of user equipments via the local area network connection to the access point via the cellular network connection,
wherein the offloaded traffic having higher priority on the local area network than other traffic on the local area network.

2. The apparatus of claim 1, wherein the at least one memory and the computer program code are further configured to, with the at least one processor, cause the apparatus to:
establish the local area network connection to the at least one of the plurality of user equipments based at least in part on the received media access control address and the service set identifier.

3. The apparatus of claim 1, wherein the at least one memory and the computer program code are further configured to, with the at least one processor, cause the apparatus to:
receive a confirmation response from the access point, wherein the confirmation response comprises an indication of the offloading capability of the at least one of the plurality of user equipments.

4. The apparatus of claim 1, wherein the at least one memory and the computer program code are further arranged to, with the at least one processor, cause the apparatus to:
provide for transmission of a beacon message, wherein the beacon message comprises an indication of offloading capability;
receive a response to the beacon message from at least one of the plurality of user equipments, wherein the response comprises an indication of offloading capability of the at least one of the plurality of user equipments; and
establish the local area network connection to the at least one of the plurality of user equipments based at least in part on the response to the beacon message.

5. The apparatus of claim 1, wherein the apparatus comprises a router.

6. An apparatus comprising:
at least one processor; and
at least one memory including computer program code, wherein the at least one memory and the computer program code are configured to, with the at least one processor, cause the apparatus to at least:
provide for transmission of a probe request, the probe request comprising an indication of offloading capability, a media access control address and a service set identifier;
receive a probe response from a dual mode router, the probe response comprising an indication of offloading capability of the dual mode router;
establish a local area network connection to the dual mode router based at least in part on the probe response;
receive, at the apparatus, first offloaded cellular network data from the dual mode router via the local area network connection and transmit, from the apparatus, second offloaded cellular network data to the dual mode router via the local area network connections;
receive a request for offloading information from the access point; and
provide for transmission of a report comprising offloading information to the access point,
wherein the first offloaded cellular network data is received by the dual mode router via a cellular network connection to an access point, the second offloaded cellular network data is transmitted by the dual mode router via the cellular network connection to the access point,
wherein the first and second offloaded cellular network data has a higher priority on the local area network than other traffic on the local area network.

7. The apparatus of claim 6, wherein the offloading information comprises at least one of a non-access stratum identifier, and local area network access capability.

8. The apparatus of claim 6, wherein the at least one memory and the computer program code are further configured to, with the at least one processor, cause the apparatus to:
receive identification information associated with a dual mode router from an access point via the cellular network connection; and
establish the local area network connection to the dual mode router based at least in part on the received identification information.

9. The apparatus of claim 6, wherein the at least one memory and the computer program code are further configured to, with the at least one processor, cause the apparatus to:
provide for transmission of an offloading request message to the access point;
receive identification information associated with at least one neighboring dual mode routers in response to the offloading request message; and
establish a local area network connection to one of the at least one dual mode routers based at least in part on the received identification information.

10. The apparatus of claim 9, wherein providing for transmission of the offloading request message and receiving identification information are performed via signaling, and wherein the signaling comprises at least one of radio resource control signaling and a media access control communication element.

11. The apparatus of claim 6, wherein the at least one memory and the computer program code are further configured to, with the at least one processor, cause the apparatus to:
receive a beacon message from a dual mode router, wherein the beacon message comprises an indication of offloading capability of the dual mode router; and
establish the local area network connection to the dual mode router in response to receiving the beacon message.

12. The apparatus of claim 6, wherein the apparatus comprises a user equipment or a mobile terminal.

13. An apparatus comprising:
at least one processor; and
at least one memory including computer program code, wherein the at least one memory and the computer program code are configured to, with the at least one processor, cause the apparatus to at least:
provide for transmission of a probe request, the probe request comprising an indication of offloading capability, a media access control address and a service set identifier;
receive a probe response from a dual mode router, the probe response comprising an indication of offloading capability of the dual mode router;
establish a local area network connection to the dual mode router based at least in part on the probe response;
provide for transmission of a request for offloading information to the user equipments;
receive a report comprising offloading information from the user equipment;
receive a request from the dual mode router to offload cellular network data associated with a user equipment to the dual mode router; and
offload the cellular network data associated with the user equipment to the dual mode router via a cellular network connection with the dual mode router, and receive cellular network data from the user equipment via the cellular network connection with the dual mode router,
wherein the dual mode router prioritizes the offloaded cellular network data to be transmitted via a local area network than other traffic on the local area network.

14. The apparatus of any of claim 13, wherein the at least one memory and the computer program code are further configured to, with the at least one processor, cause the apparatus to:
establish a cellular network connection to the access point; and
establish a cellular network connection to the dual mode router.

15. The apparatus of claim 13, wherein the dual mode router is configured to maintain a connection to both a cellular network and a local area network at the same time.

16. The apparatus of claim 13, wherein:
providing for transmission to the dual mode router of identification information associated with the user equipment occurs in response to receiving a request from the dual mode router for an indication of whether the user equipment is configured for offloading;
the identification information associated with the user equipment comprises an indication of whether the user equipment is configured for offloading; and
the apparatus comprises a base station.

* * * * *